United States Patent [19]

Young et al.

[11] Patent Number: 4,624,543

[45] Date of Patent: Nov. 25, 1986

[54] METHOD AND APPARATUS FOR ELECTROPHOTOGRAPHICALLY PROCESSING INFORMATION

[75] Inventors: James R. Young, Palo Alto; Norman A. Peppers, Belmont, both of Calif.

[73] Assignee: Savin Corporation, Stamford, Conn.

[21] Appl. No.: 296,297

[22] Filed: Aug. 26, 1981

[51] Int. Cl.[4] .................................. G03G 15/00
[52] U.S. Cl. .......................... 355/3 R; 355/14 R; 355/14 CH; 358/300
[58] Field of Search .............. 355/3 R, 14 R, 14 CH, 355/8; 358/296, 300, 302; 365/112, 106

[56] References Cited

U.S. PATENT DOCUMENTS

| | | | |
|---|---|---|---|
| 4,204,725 | 5/1980 | DiStefano et al. | 355/3 R |
| 4,239,372 | 12/1980 | Iwai | 355/3 DD X |
| 4,257,701 | 3/1981 | Hirayama et al. | 355/3 R X |
| 4,297,713 | 10/1981 | Ichikawa et al. | 355/3 R X |
| 4,320,955 | 3/1982 | Kay | 355/3 R |
| 4,345,835 | 8/1982 | Kramer et al. | 355/3 R |
| 4,351,005 | 9/1982 | Imai et al. | 355/3 R X |

Primary Examiner—A. C. Prescott
Attorney, Agent, or Firm—Shenier & O'Connor

[57] ABSTRACT

Electrophotographic apparatus capable of being operated in the copying mode and scanning mode and in the printing mode and scanning mode, in which a latent electrostatic image, formed on the photoconductor, is developed. The photoconductor has a light-reflective surface. After the latent electrostatic image is developed, a focused laser beam or focused light beam scans the developed image and specularly reflected light from the photoconductor surface is directed onto a photodetector. The output of the photodetector is encoded and may be transmitted or stored. The developed image is not destroyed, and it can then be transferred to a carrier sheet if desired.

3 Claims, 5 Drawing Figures

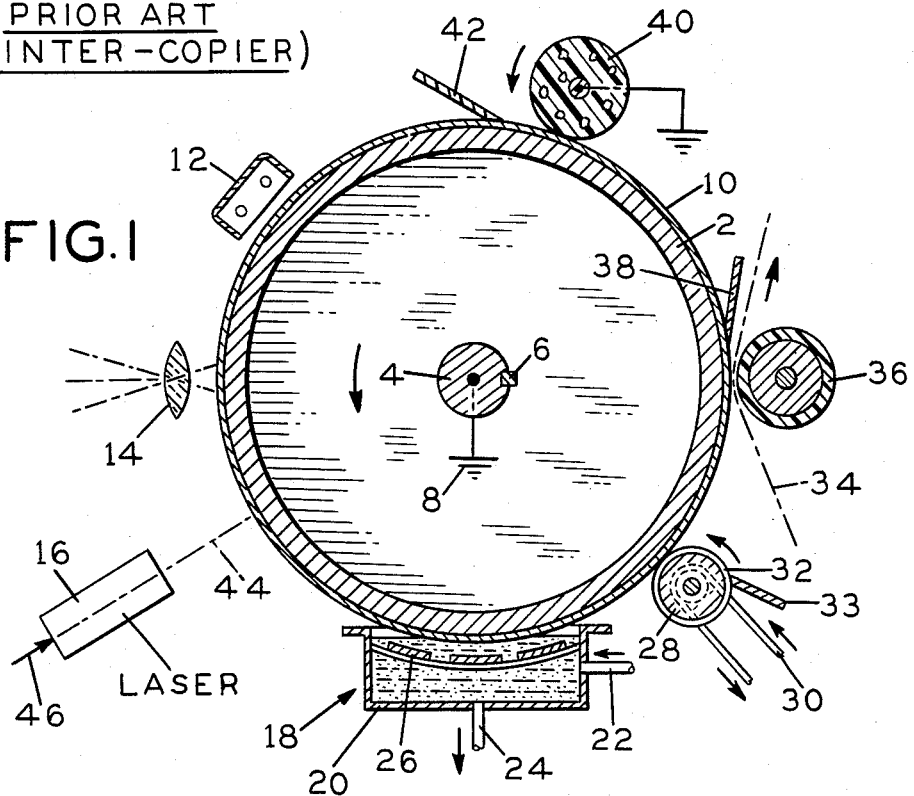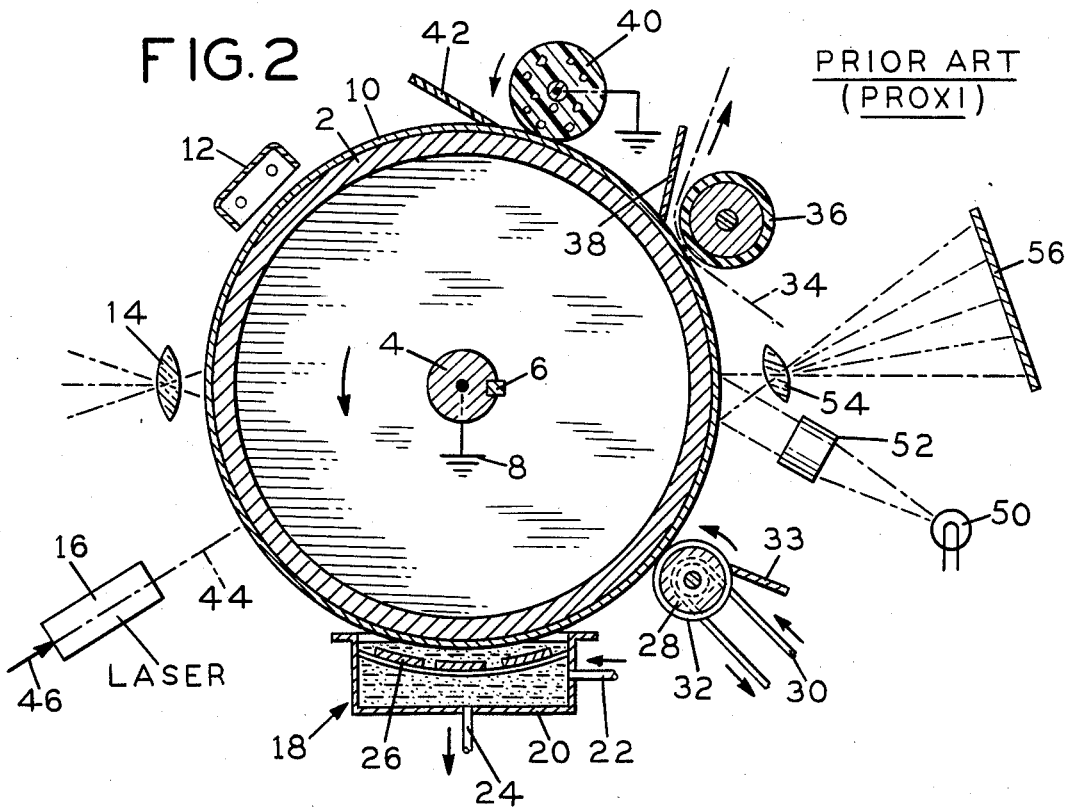

(PAT. 4,204,725)

METHOD AND APPARATUS FOR ELECTROPHOTOGRAPHICALLY PROCESSING INFORMATION

BACKGROUND OF THE INVENTION

In a conventional electrophotographic copying machine, a photoconductor is charged and subjected to imagewise exposure, through an optical system, to form a latent image of the original information, which may be any document such as a printed page, a drawing, or a photograph. The latent image thus formed is then developed and the developed image transferred to a carrier sheet such as paper. This is the copying mode.

It is also known that electrophotographic apparatus may be operated in a printing mode, in which a modulated scanning laser beam discharges a charged photoconductor as a function of the desired information, thus producing a latent electrostatic image corresponding to the information. This image is then toned and transferred, as in the case of an image formed optically from an original.

It is desirable to provide apparatus which can operate in a scanning mode, as well as the copying mode and printing mode. Optical systems are expensive. Solid-state lasers, as a source of light, are an economical and efficient way to scan an original. Unfortunately, a laser diode, while inexpensive, operates in a very narrow wavelength and is unsatisfactory for scanning a colored original, though it can be used to scan a black and white document. The use of multi-wavelength lasers to scan an original document would be expensive, cumbersome, and unreliable. Thus, the production of apparatus which is capable of operating in the printing mode and the scanning mode or in the copying mode and the scanning mode has not been feasible.

In view of the apparent difficulty of scanning an original document with a laser to derive an input for a facsimile system, electrophotographic devices of the art have produced a latent image by optical means and then scanned that latent image either with a laser beam or with a pin tube. The scanning of the latent image with a laser erases it, as does the scanning of the latent image with an electron beam from a pin tube. It will be seen that the devices of the prior art which operate in the scanning mode can operate in that mode alone. No device of the prior art can operate in both the copying mode and scanning mode and in the printing mode and scanning mode.

FIELD OF THE INVENTION

The field of the invention is a method and apparatus for electrophotographically processing information in the copying mode and scanning mode or in the printing mode and scanning mode, so that the method and apparatus of our invention may be operated in all three modes at the will of the operator.

DESCRIPTION OF THE PRIOR ART

Nishivama et al U.S. Pat. No. 3,681,527

This patent discloses electrophotographic apparatus which, in the copying mode, acts as a conventional electrophotographic copying machine. The assembly may be operated in a reading mode, in which a latent electrostatic image is formed as in the copying mode but the latent electrostatic image, optically formed, is not developed. Instead, it is read by a pin tube which scans the image with an electron beam, so that the output of the pin tube is then transmitted as the input to a remote recording device such as a facsimile receiver. In the recording operation, which is a printing mode, the photoconductor is sprayed with electrons as a function of an input from a remote facsimile transmitter, thus forming a latent electrostatic image which is then developed to form a visible image which is finally transferred to a carrier sheet. It will be seen that, once the latent electrostatic image is scanned, it is erased and can no longer be developed. Furthermore, scanning with an electron beam would require a vacuum, since the electron beam could not traverse the atmosphere without ionizing it. Nishiyama et al suggest that the pin tube is in contact with or adjacent the drum. If it were in contact with the drum, it would scratch the photoconductor; if it were adjacent the drum, inonization would destroy the accuracy of the reproduction if it operated at all.

Branham et al U.S. Pat. No. 4,046,471

This patent shows electrophotographic apparatus which can be operated in the copying mode or in the printing mode. In the copying mode, an original document is optically projected on a charged photoconductive drum to form a latent image which is then developed in a known fashion. In the printing mode, a data processor controls a laser printing beam to form the latent image which is then developed in a conventional manner. There is no scanning mode.

Starkweather U.S. Pat. No. 4,084,197

This patent shows an electrophotographic printer in which a modulated light beam (preferably a laser) scans a charged electrophotographic surface carried by a drum to form the latent electrostatic image which is then developed in a conventional manner. This apparatus operates in the printing mode only, since no provision is made for forming the latent electrostatic image in any other manner.

Imai et al U.S. Pat. No. 4,171,902

This patent shows electrophotographic apparatus, similar to Starkweather, which operates only in the printing mode and uses a modulated scanning laser. It employs an adjuster and a focusing lens, which contribute to the accuracy of the latent image on a charged photoconductive surface from a modulated laser beam.

DiStefano et al U.S. Pat. No. 4,204,725

This patent discloses, as prior art, a printer-copier such as shown in Branham et al and shows the additional disclosure of scanning an optically formed latent electrostatic image with a laser beam. DiStefano et al provide a sensing electrode and circuitry to detect the discharge of current induced by the laser beam from a latent electrostatic image on the photoconductive surface. This current is then amplified and converted into a codable signal for either computer storage or facsimile transmission. When the laser beam strikes the latent electrostatic image, it erases it, so the only record of what has been transmitted is the original. The novelty of DiStefano et al is the provision of apparatus which may operate in a copying mode or in a scanning mode, but not also in a printing mode. It is suggested, in DiStefano et al, that apparatus might be operated in the scanning mode by scanning the toned image on the photoconductive drum, but it is pointed out that this is fundamentally awkward in that both the photoconductor and the toner particles would be absorbing at the wavelength of the printing laser, so that the contrast would be poor and the resulting signal difficult to process. Furthermore, it would be necessary to use multi-wavelength lasers to avoid the deleterious absorption of laser light.

It has been disclosed by G. R. Mott, H. E. Clark, and J. H. Dessauer, in *Photographic Science & Engineering*, Volume 5, pp. 87-90 (1961), that an image developed on a photoconductive drum may be projected for rapid display. Their projection system was given the acronym PROXI, derived from "Projection by Reflection Optics of Xerographic Images". Their system involved a selenium plate which was charged, exposed, and developed to produce a developed image on the selenium plate. No scanning was involved, and the system made use of the surface reflectivity of selenium, which is about twenty-seven percent. This was considered sufficient to provide good visibility on small and medium-size screens without affecting the selenium surface adversely by the high light levels necessary for projection.

SUMMARY OF THE INVENTION

In general, our invention contemplates the provision of an improved method and apparatus for electrically processing information derived from an original document. We provide an apparatus which can be operated not only in the printing or copying modes or in the scanning mode alone as in the prior art, but also apparatus capable of operating at the will of the operator in a copying mode and a scanning mode or in a printing mode and a scanning mode. The construction of our apparatus is dictated by a new method of scanning which avoids the difficulties of the prior art and, when operated in the scanning mode, can produce a signal which may be encoded, stored, or facsimile-transmitted. Instead of scanning a latent electrostatic image and thus erasing it, we first develop the image on the surface of a reflective photoconductor so that the scanning light will be reflected from the non-toned portions of the developed image. Reflected specular light is then directed onto a photoconductor, the output of which is then coded and transmitted or stored. While we prefer to use a focused laser as the light beam, our method is several orders of magnitude more effective than scanning the original document with light, so that we can use a focused light beam as the scanning illumination.

OBJECTS OF THE INVENTION

One object of our invention is to provide an improved electrophotographic apparatus which may operate in the printing mode or the copying mode and in the scanning mode as well.

Another object of our invention is to provide a novel method of scanning an image developed on a photoconductor to develop a signal which may be transmitted to receiving equipment analogous to a facsimile receiver at a distant point.

Still another object of our invention is to provide electrophotographic apparatus which has not only scanning capability, but is also capable of operating in the copying mode and in the printing mode.

A further object of our invention is to provide a novel scanning method in which a single monochromatic focused laser beam or a focused light beam may be used as the light for the scanning means.

A still further object of our invention is to provide novel electrophotographic apparatus for employing a single monochromatic laser beam for scanning a developed electrostatic image.

Other and further objects of our invention will appear from the following description.

BRIEF DESCRIPTION OF THE DRAWINGS

In the accompanying drawings, which form part of the instant specification and which are to be read in conjunction therewith, and in which like reference numerals are used to indicate like parts in the various views:

FIG. 1 is a diagrammatic view of a printer-copier of the prior art, as disclosed in Branham et al U.S. Pat. No. 4,046,471.

FIG. 2 is a diagrammatic view showing the electrophotographic apparatus identified by the acronym PROXI.

DESCRIPTION OF THE PREFERRED EMBODIMENT

Figure 3:
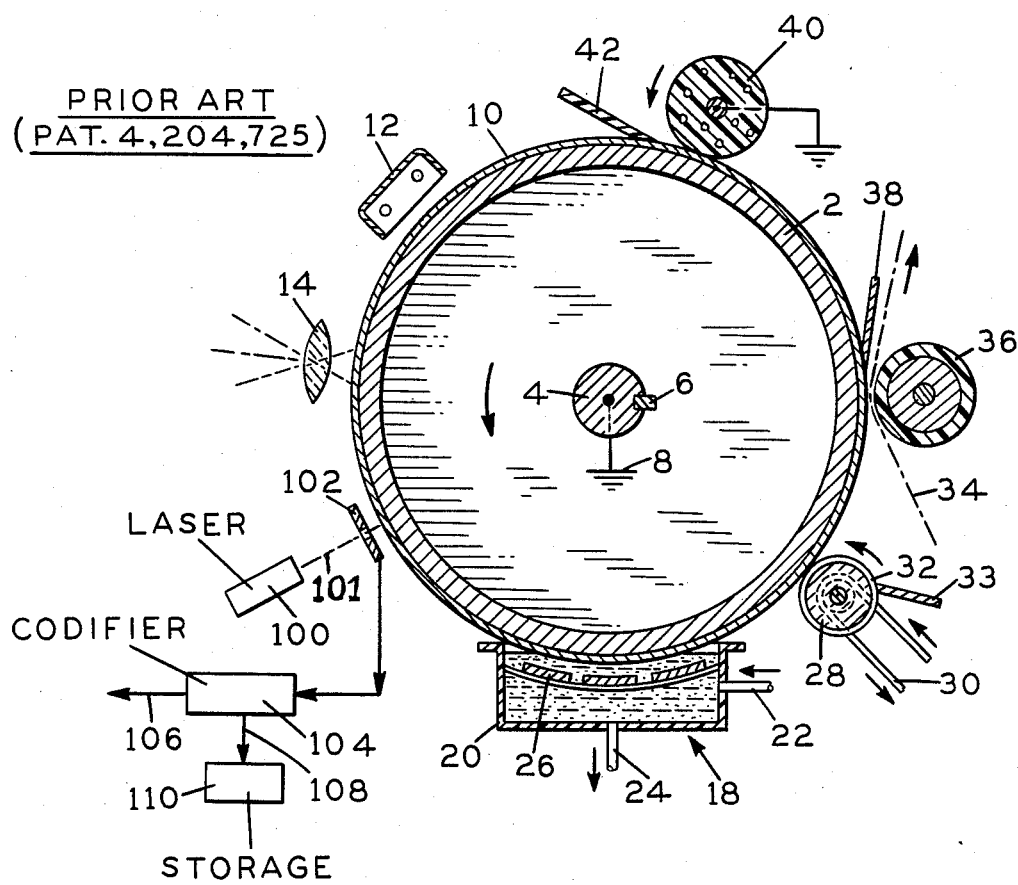
FIG. 3 is a diagrammatic view of electrophotographic apparatus adapted to operate in the copying mode and in the scanning mode, in which a latent electrostatic image is scanned by a laser, as described in DiStefano et al U.S. Pat. No. 4,204,725.

More particularly, referring now to FIG. 1, a metal drum 2 is secured to a shaft 4 by a key 6 so that it will rotate with the shaft 4 in the direction of the arrow by means of a prime mover (not shown). The shaft 4 is earthed at ground 8. The metal drum 2 carries a light-reflecting photoconductive layer 10 which is adapted to be charged by corona discharge device 12. In the copying mode of the operation of the printer-copier of FIG. 1, a lens 14 is adapted to expose the charged photoconductor to an image of the original being copied. It is understood, of course, that a photoconductor is substantially an insulator in the dark and substantially a conductor in the light, so that the apparatus is encased in a lightproof housing (not shown), as is well known in the art. A scanning laser 16 is not operated in the copying mode, and the latent electrostatic image generated by the lens 14 is developed at a developing station indicated generally by the reference numeral 8. A liquid developer is introduced into tank 20 through pipe 22 and recirculated from pipe 24 by a pump (not shown). The latent image is wet with liquid developer through which are disseminated toner particles of the right polarity, depending on the nature of the photoconductor. A biasing electrode system 26, known to the art, prevents the background or non-image areas from being toned. A metering roller 28, driven by a belt 30 in the same direction of rotation as that of drum 2, ensures that the surface of the metering roller will move opposite in direction to the surface of the photoconductor. A spacing rim 32 on the metering roller prevents the surface of the metering roller from touching the developed electrostatic image and reduces the amount of liquid on the drum in the area of the developed image. A wiper blade 33 keeps the surface of the metering roller 28 clean. Paper or other carrier medium 34 is pressed against the developed image by a transfer roller 36 which may be biased if desired. A pickoff blade 38 picks the paper bearing the image from the drum 2. A cleaning roller 40 cleans the surface of the photoconductor and is assisted in the cleaning operation by a wiping blade 42, thus preparing the photoconductor for its next cycle of operation.

In the printing mode, there is no original exposed by lens 14. Instead, the image to be developed is generated on a charged photoconductor by a beam 44 of the scanning laser 16 which is modulated by an input signal through conductor 46 and scanned in any manner known to the art, such as shown in Branham et al U.S. Pat. No. 4,046,471 or Starkweather U.S. Pat. No. 4,084,197. It will be seen that FIG. 1, representing the prior art, illustrates a printer-copier known to the art but which has no scanning capability.

In FIG. 2, the latent image is developed, and the developed image may optionally be transferred to the carrier sheet 34 when the apparatus is operated in a copying mode as in FIG. 1. This will provide a permanent record. If, however, it is desired to view information for rapid access where quick decisions must be made before a group of people, the developed image may be projected. It is understood, of course, that the latent image may be formed optically or by a laser printer as in FIG. 1. A light source 50 passes through a condenser 52 and is reflected from the surface of the photoconductor through a lens 54 to a screen 56. If the photoconductor is selenium, the process is operative only for small or medium-size screens. This is owing to the fact that the reflectivity of amorphous selenium is only about twenty-seven percent and a high level of illumination is required for projection. A large screen would require such intense illumination that the heat generated would damage the selenium if the exposure were prolonged.

Referring now to FIG. 3, the apparatus there shown may be operated in the copying mode, as is known to the art. In such case, the scanning laser 100 is not operated. This laser, however, is not the same as the laser 16 of FIG. 1; that is, the laser does not impart information to the photoconductor. Instead, its scanning beam 101 gathers information from the latent image generated on the photoconductor by the projection lens 14. The scanning laser 100 in FIG. 3 is associated with a sensing electrode 102. The current discharged from the photoconductor by the laser induces the current on the sensing electrode 102. This current is amplified and codified in a codifier 104, and the amplified codified signal may then be transmitted to a distant facsimile apparatus (not shown) through conductor 106 or passed through conductor 108 for storage in a computer memory or storage 110. It will be observed that, in gathering information from the photoconductor, the laser beam 101 sweeps axially of the photoconductor along the sensing electrode 102 which extends axially parallel to the shaft 4. This sweep of the laser beam will erase the latent electrostatic image, so that there is nothing left to develop. Stated otherwise, the apparatus in FIG. 3 can be operated in the copying mode or the scanning mode, but not both. Furthermore, the apparatus of FIG. 3 cannot be operated in the printing mode.

Figure 4:
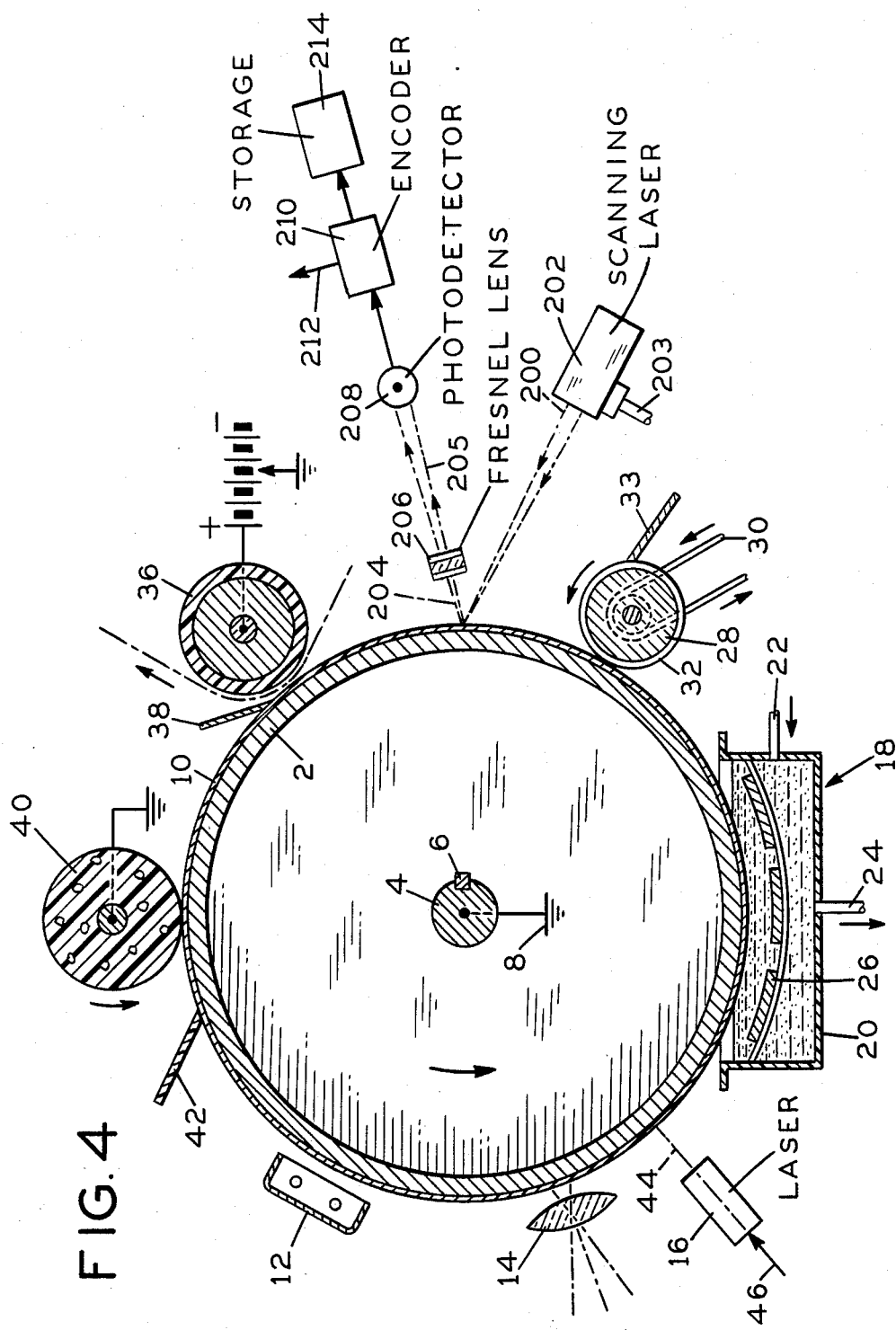
FIG. 4 is a diagrammatic side view of the electrophotographic apparatus of our invention, capable of carrying out the process of our invention.

Referring now to FIG. 4, the metal drum 2 forms a conductive substrate for the photoconductive layer 10. This layer is light reflecting, so that light striking the photoconductor surface will be reflected from it. The photoconductor surface is charged by the corona discharge device 12 and a latent image is formed on the charged photoconductor optically from a light and shade image of the original and focused by lens 14 onto the charged photoconductor surface. The latent electrostatic image is then developed as is usual in the copying or printing mode. A scanning laser 202 provides a converging light beam 200 of approximately ¼ inch diameter which is focused to a spot of approximately three mils diameter at the surface of drum 2. The diverging beam 204 reflected from drum 2 passes through a Fresnel lens 206 and impinges upon a photodetector 208. The direction of scan is normal to the plane of the drawing in FIG. 4, as by oscillating laser 202 about shaft 203. Alternatively a galvanometer driven mirror may be used. The center of beam 200 preferably intersects shaft 203. Thus shaft 203 defines a scanning center from which light rays may generally be considered to emanate.

Figure 5:
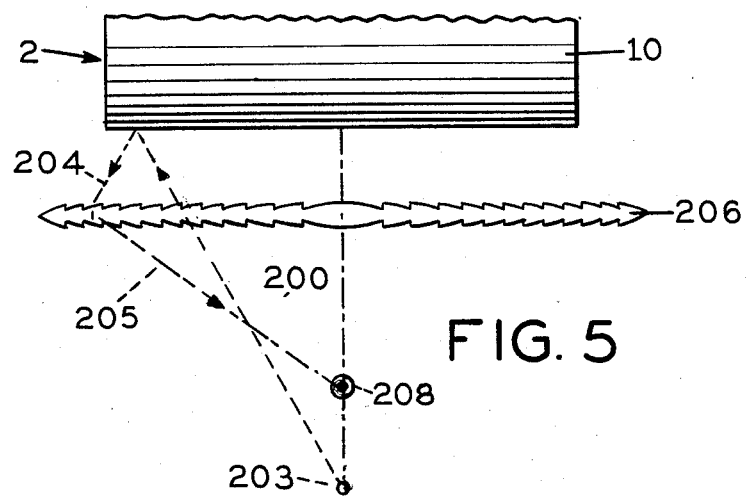
FIG. 5 ia a fragmentary plan view of our apparatus.

As may be seen by reference to FIG. 5, lens 206 collects all rays that are specularly reflected from the drum. The location and focal length of lens 206 are such that an image of beam 200 at the scanning center, that is, at shaft 203, would be formed on photodetector 208. Lens 206 ensures that all rays specularly reflected from the surface of drum 2 will fall upon photodetector 208. The output of the photodetector may be amplified and encoded by an amplifer-encoder 210, and the coded output signal may pass to a distant facsimile apparatus through a conductor 212 or be stored in a memory 214 for future use.

For diffusely reflected light, lens 206 forms an image of the drum surface that is very large and grossly out of focus at the plane of photodetector 208, thus ensuring that only a very small fraction of diffusely reflected light reaches the detector. Therefore it can be seen that the optical configuration of our invention causes a very high signal to be produced by detector 208 for light that is specularly reflected from the drum and causes a very low signal to be produced by detector 208 for light that is diffusely reflected from the drum. When light beam 200 strikes a portion of the drum surface that has not been toned, a large fraction of the beam power is specularly reflected from the mirror-like surface of the drum which has a typical reflectance in the range 40% to 95%. When light beam 200 strikes a portion of the drum surface that has been toned, almost 100% of the beam power is either diffusely reflected or absorbed and only a very tiny fraction of the beam power is specularly reflected. Thus, for typical conditions, the signal from photodetector 208 when beam 200 strikes a non-toned portion of the drum is several hundred times as great as the signal that is produced when beam 200 strikes a toned portion of the drum.

During the course of scan, the steps of Fresnel lens 206 produce a small ripple in the amount of light falling on detector 208. The amount of ripple is decreased by decreasing the size of each step and correspondingly increasing the number of steps. We have found that a Fresnel lens having between one and two steps per millimeter along the line of scan results in a negligible ripple of less than $\pm 5\%$ which is undiscernable by the naked eye.

The distance from scanning center 203 to drum 2 may be six inches; the distance between drum 10 and lens 206 may be two inches; and the distance between lens 206 and detector 208 may be four inches, for example. In this example, the focal length of lens 206 should thus be $8/3 = 2.67$ inches.

For diffusely reflected light, the scan line on the surface of the drum constitutes the source or object for lens 206 which forms a virtual image of this object behind the drum, in the example given. Very little of the light from this virtual image reaches detector 208.

For specularly reflected light, beam 200 at the location where it intersects axis 203 constitutes the source or object for lens 206 which forms a real image of this object on detector 208. The optical magnification of this imaging system is equal to the ratio of the image distance to the object distance which, for the example given, is 4 inches/8 inches=½. Thus, the size of the real image that is formed by beam 205 as it impinges on detector 208 is (½)×(¼ inch)=⅛ inch. Detector 208 should have a photosensitive area, as may be defined by an aperture, which fully accepts the impinging beam 205 having a diameter of approximately ⅛ inch for the example given.

This discussion has treated the surface of the drum as though it were a plane mirror although it is in fact a cylindrical mirror. The treatment is justified on practical grounds because the size of the focused beam on the surface of the drum is small; in the example given, it was about three mils in diameter. If the size of the focused beam were large, say 10 times larger than the example or 30 mils, the practical effect is that the size of the photosensitive area of detector 208 should be somewhat larger, depending upon the radius of curvature of the drum, than the ⅛ inch given in the example.

We have found that because our invention discriminates effectively between specularly and diffusely reflected light, high contrast images can be produced even when the differential absorption between the toner particles and the photoconductor material is small. We are able to take maximum advantage of the much more powerful discriminant—that is, the scattering of light—than the absorption of light. We are thus enabled to achieve high-contrast images, even if the differential absorption were negligible. Our method and apparatus are so efficient, by several orders of magnitude, that more sharply contrasting images are obtained than would be obtained by scanning the original document. This cannot be scanned with a monochromatic laser because color rendition will not be thus achieved. Moreover, scanning the original document with a non-laser light beam is impractical because the reflected light will be diffused and must be collected and detected by means which are very inefficient when compared to our means. In contradistinction to this, in our invention the photoconducting surface is mirror-like, so that, when light strikes it, it is effectively striking a good reflector and the reflected light may then be gathered and directed onto a photodetector, thus achieving our greatly improved results.

It will be observed that the PROXI system displays a spatial image and has no scanning capability. Our invention provides an electronic image which may be encoded and stored or transmitted. The PROXI system does not use a scanning incident beam; nor does it use a laser.

It will be seen that we have accomplished the objects of our invention. We have provided an improved electrophotographic method and apparatus which enables us to operate in the printing mode, in the copying mode, and in the scanning mode as well. We have provided a novel method of scanning the image developed by a photoconductor to develop a signal which may be transmitted to receiving equipment analogous to a facsimile receiver at a distant point. Our electrophotographic apparatus not only has scanning capability, but is capable of operating in the copying and scanning modes or in the printing and scanning moves simultaneously. We have provided a novel method and apparatus for scanning with a single monochromatic laser beam. Our novel method and apparatus employ a single monochromatic laser beam for scanning a developed electrostatic image, instead of a latent electrostatic image as taught by the prior art.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for electrophotographically processing information including in combination a photoconductor having a surface, means for electrostatically charging the surface of said photoconductor, means for forming a latent electrostatic image of the desired information on said charged surface, means for developing said latent electrostatic image to form a visible toned image thereof, means for scanning along a line of said visible image with a light beam, a photodetector, and means including a lens for directing light specularly reflected from said photoconductor along the scan line onto said photodetector, said lens having a certain focal length and being positioned at a distance from said surface which is less than its focal length to produce a virtual image of the scan line behind said surface and remote from the photodetector.

2. Apparatus as in claim 1 wherein the lens is of the Fresnel type and has of the order of magnitude of one to two steps per millimeter along its length parallel to the scan line.

3. Apparatus as in claim 1 wherein the lens is of the Fresnel type and has a sufficient number of steps per unit length parallel to the scan line that the ripple in light directed upon the photodetector from any untoned portion of the scan line is less than ten percent.

* * * * *